(12) United States Patent
Yu

(10) Patent No.: US 8,733,092 B2
(45) Date of Patent: May 27, 2014

(54) WAVE POWER CONVERTING DEVICE

(71) Applicant: Yun-Chang Yu, Taichung (TW)

(72) Inventor: Yun-Chang Yu, Taichung (TW)

( * ) Notice: Subject to any disclaimer, the term of this patent is extended or adjusted under 35 U.S.C. 154(b) by 0 days.

(21) Appl. No.: 13/966,249

(22) Filed: Aug. 13, 2013

(65) Prior Publication Data

US 2014/0075932 A1    Mar. 20, 2014

(30) Foreign Application Priority Data

Sep. 14, 2012 (TW) .............................. 101133752 A

(51) Int. Cl.
| | |
|---|---|
| *F03B 13/18* | (2006.01) |
| *F03B 13/10* | (2006.01) |
| *F03B 13/12* | (2006.01) |
| *F04B 17/00* | (2006.01) |
| *F04B 35/00* | (2006.01) |

(52) U.S. Cl.
USPC ................ 60/497; 290/42; 417/331; 417/333

(58) Field of Classification Search
USPC ........ 60/495–507; 290/42; 417/330, 331, 333
See application file for complete search history.

(56) References Cited

U.S. PATENT DOCUMENTS

| 3,569,725 A | * | 3/1971 | Rosenberg ...................... 290/53 |
| 3,595,189 A | * | 7/1971 | McLean et al. ................ 114/382 |
| 3,930,168 A | * | 12/1975 | Tornabene ...................... 290/53 |

FOREIGN PATENT DOCUMENTS

CN           201025231 Y    2/2008

* cited by examiner

*Primary Examiner* — Christopher Jetton

(57) ABSTRACT

A wave power converting device includes a platform, a plurality of first and second fluid guide assemblies and floating assembly. The platform has a retaining post anchored to an underwater ground. The first and second fluid guide assemblies are disposed underwater so that the water could flow into the first and second fluid guide assemblies. The floating assembly could be moved up and down relative to the platform so as to press the water upwardly through the first and second fluid guide assemblies to a reservoir. Under this arrangement, the energy potential of the water in the reservoir can be converted into electrical power.

5 Claims, 7 Drawing Sheets

WAVE POWER CONVERTING DEVICE

BACKGROUND OF THE INVENTION

1. Field of the Invention

The present invention relates to a power converting device, and more particularly to a wave power converting device which converts wave potential into electrical energy.

2. Description of Related Art

Sustainable energy has become an important issue in the recent decades. Green energy is a renewable energy from nature, which can be effectively converted to electrical power. Specifically, green energy could reduce dependence on fossil fuel resources and consumed without any significant negative impact to the environment. Therefore, the development of renewable energy is continuously progressing.

The general green energy sources are described as following: Solar energy, which is collected by solar panels and converted to electrical power. Wind energy, which uses wind turbines to produce electrical power. Tidal energy, which is a form of hydropower converted into electrical power. Furthermore, other green energy sources, such as artificial photosynthesis are utilized.

However, the development and utilization of green energy sources should be more progressed and diversified. Specifically, wave power could be extracted more efficiently so as to convert the potential energy of waves to electrical power.

The present invention has arisen to mitigate and/or obviate the disadvantages of the conventional wave power converting device.

SUMMARY OF THE INVENTION

The main objective of the present invention is to provide an improved wave power converting device.

To achieve the objective, a wave power converting device comprises a platform, the platform having a retaining post anchored to an underwater ground, a plurality of first fluid guide assemblies assembled to the platform, each of the first fluid guide assemblies having a first guide tube and a first side tube, the first guide tube disposed underwater with one end, the first side tube extended upwardly from one lateral side of the first guide tube, a plurality of second fluid guide assemblies assembled to the platform, each of the second fluid guide assemblies having a second guide tube and a second side tube, the second guide tube disposed underwater with one end, the second side tube extended downwardly from one lateral side of the second guide tube, a floating assembly, the floating assembly having a top plate, a bottom plate and a connecting rod, the floating assembly assembled to the platform and the floating assembly being movable up and down relative to the platform, the top plate having a plurality of first pistons extended downwardly therefrom, each of the first pistons inserted into the respective first side tube, the bottom plate having a plurality of second pistons extended upwardly therefrom, each of the second pistons inserted into the respective second side tube, the top plate having a plurality of positioning grooves defined around an outer periphery thereof, the adjacent positioning grooves being separated by a distance, the first fluid guide assemblies and the second fluid guide assemblies being located in the corresponding positioning grooves. Wherein, the connecting rod is movably mounted around the retaining post of the platform; the first guide tube and the second guide tube both have two check valves disposed therein; the first side tube is connected to the first guide tube between the two check valves of the first guide tube; the second side tube is connected to the second guide tube between the two check valves of the second guide tube. The wave power converting device further comprises a plurality of support rails disposed on outer peripheries of the respective first guide tube and the respective second guide tube; the support rails are mounted on the corresponding first guide tube and the second guide tube; the buoy body has a plurality of slide portions mounted on one side thereof; the adjacent slide portions are separated by a distance; the slide portions correspond to the support rails so that the buoy body could be slid relative to the support rails via the slide portions. Furthermore, each slide portion has a sliding wheel assembled therein and contacted to the corresponding support rail.

Under this arrangement, when the buoy body is moved by the waves so as to drive the floating assembly moved up and down, the water flows into the first guide tube and the second guide tube and the water in the first guide tube and the second guide tube is pressed upwardly via the reciprocation of the first piston and the second piston, so that the water flows upwardly to a reservoir above the platform.

Further benefits and advantages of the present invention will become apparent after a careful reading of the detailed description with appropriate reference to the accompanying drawings.

DETAILED DESCRIPTION OF THE INVENTION

Figure 1:
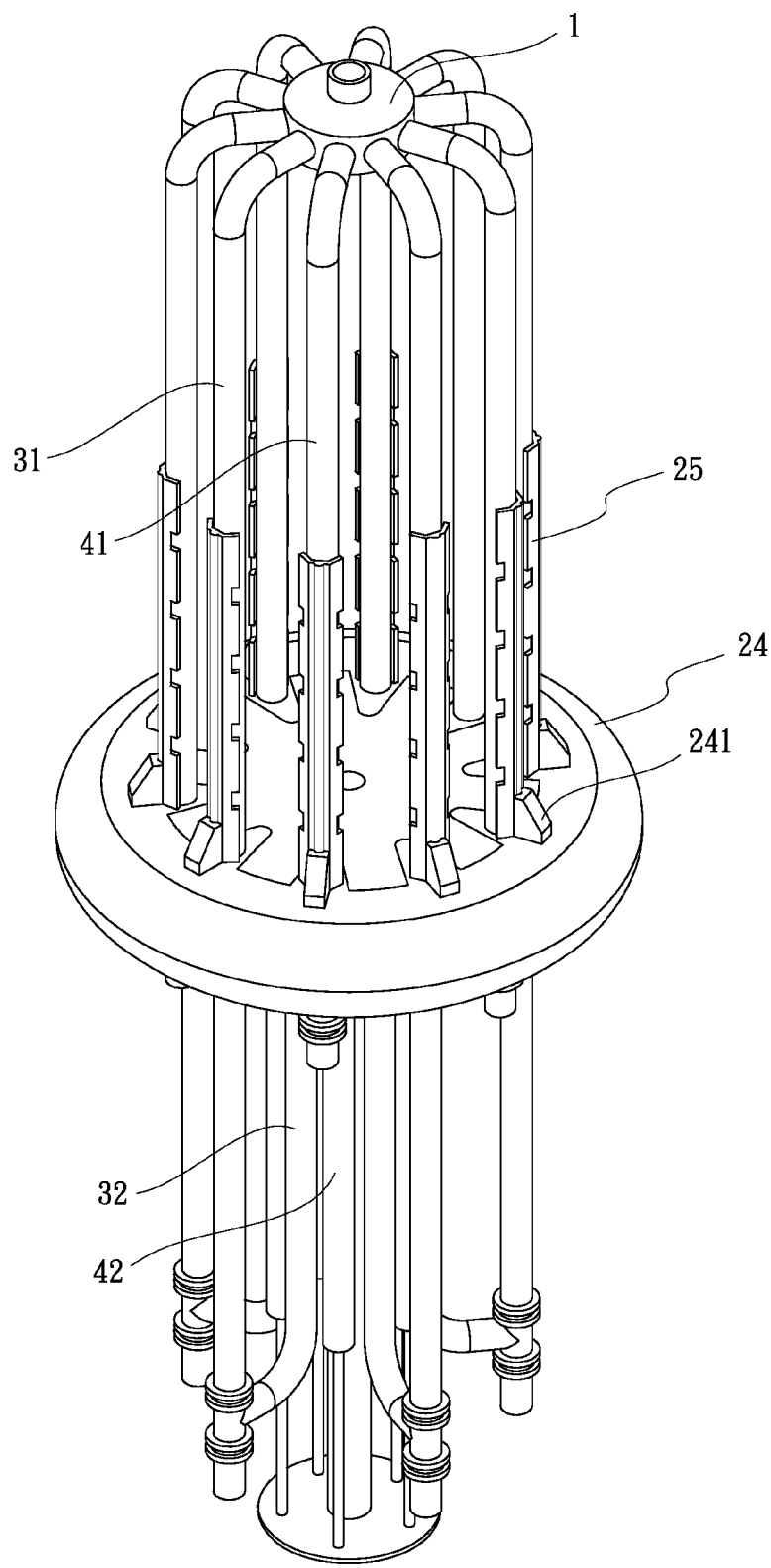
FIG. 1 is a perspective view of a wave power converting device of the present invention.
Figure 1A:
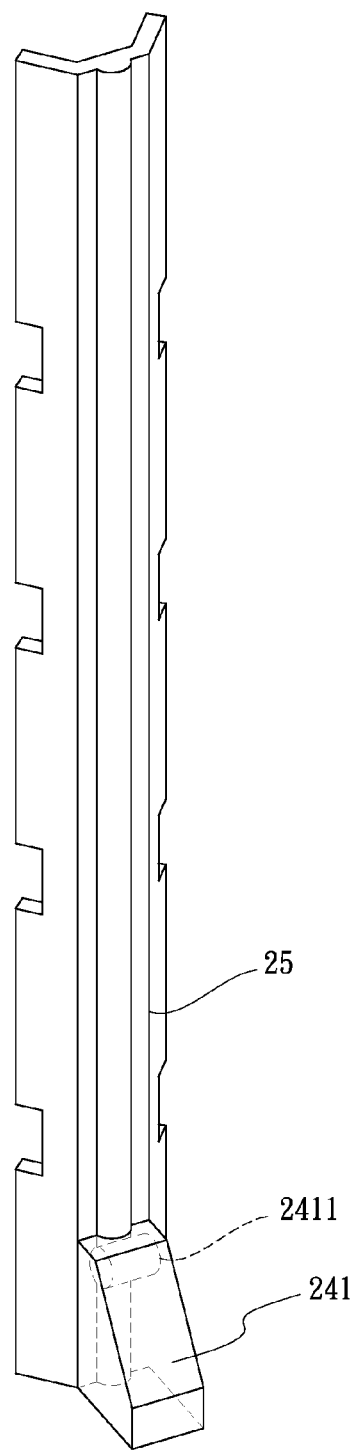
FIG. 1A illustrates that a slide portion has a sliding wheel corresponding to a support rail.
Figure 2:
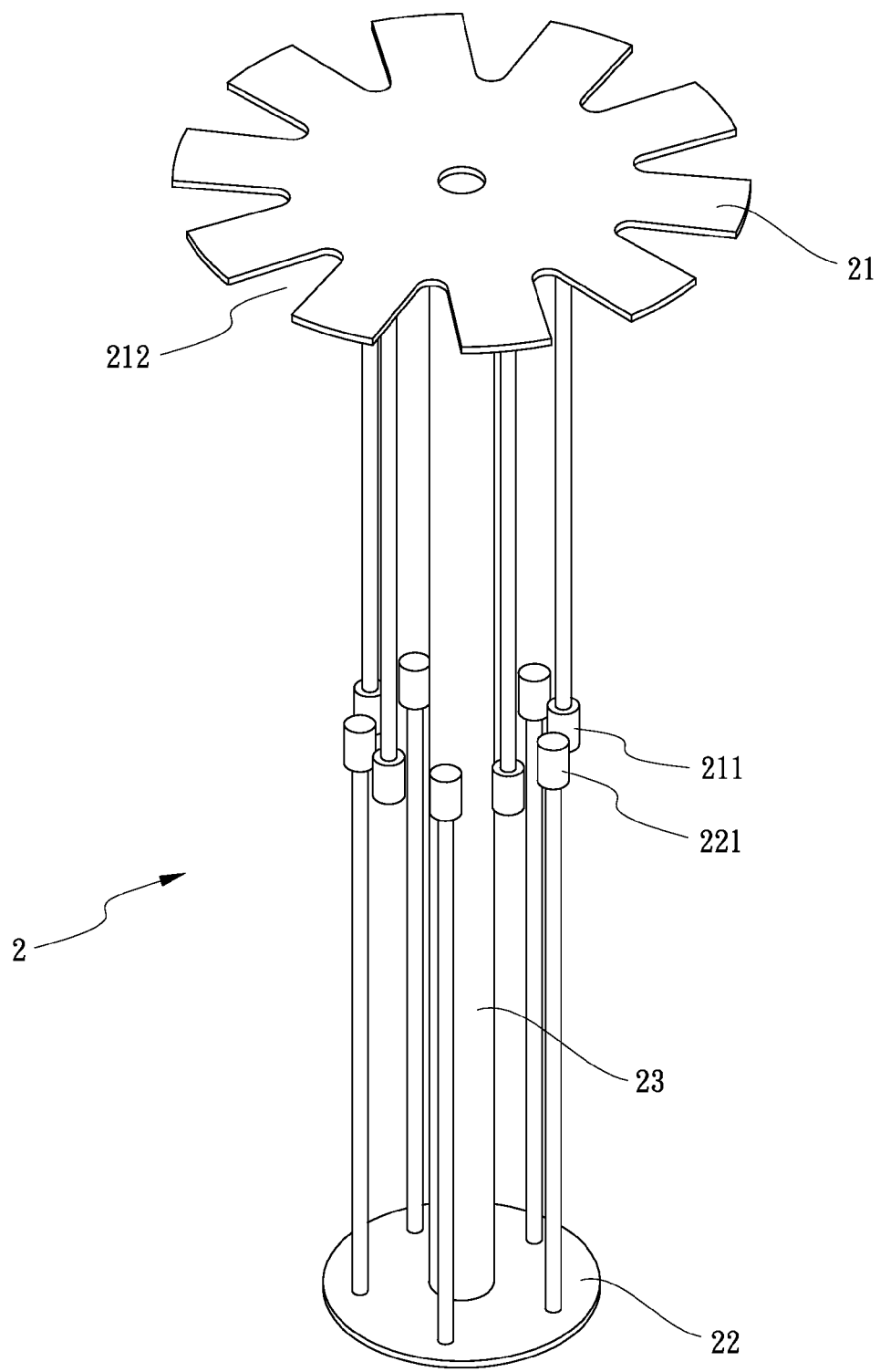
FIG. 2 is a perspective view of a floating assembly of the wave power converting device.
Figure 5:
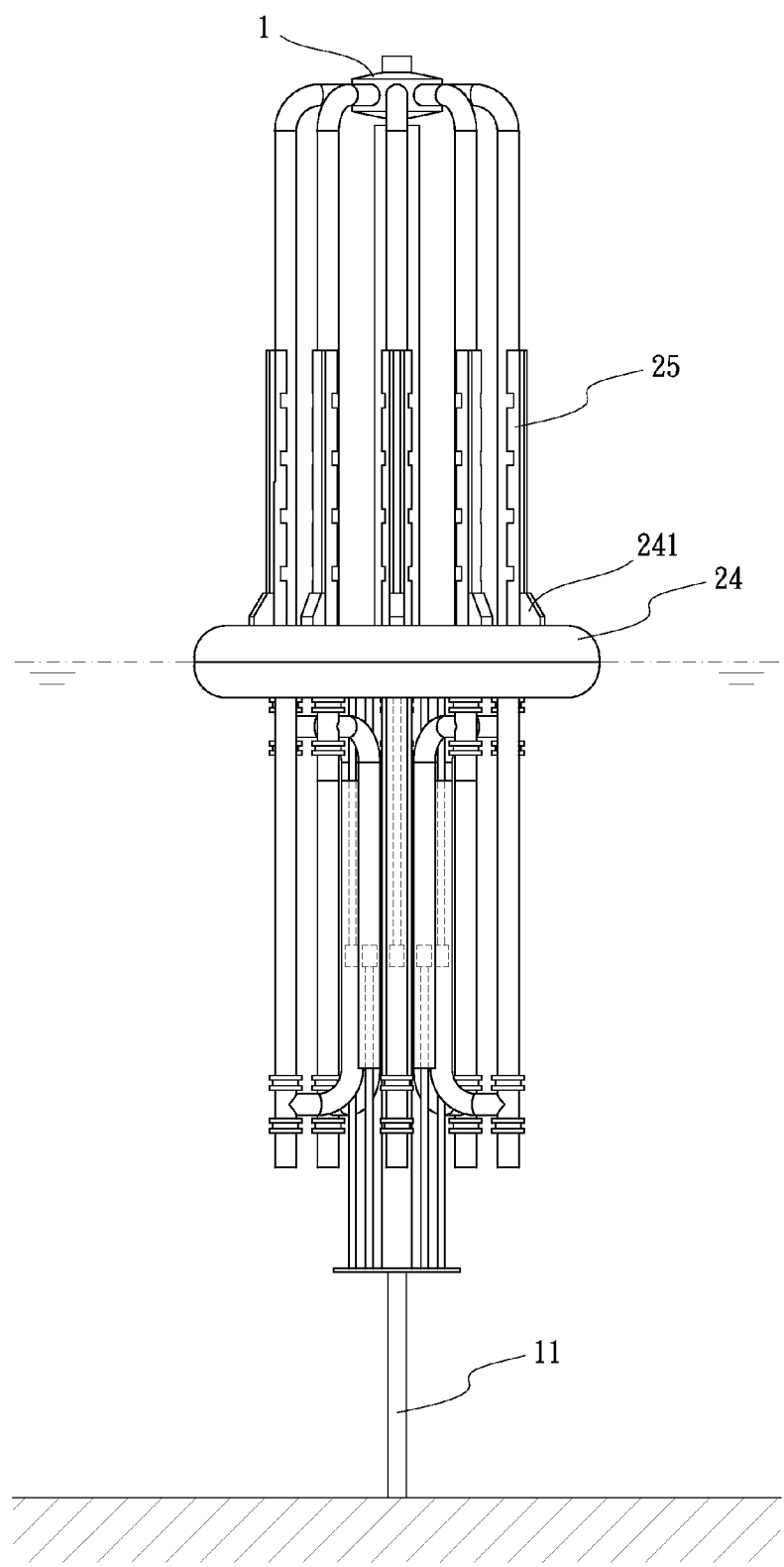
FIGS. 5-7 illustrate the wave power converting device, wherein the floating assembly with a buoy body is movable relative to a retaining post.

Referring to FIGS. 1-2 and 5, a wave power converting device in accordance of the present invention comprises a platform 1, a floating assembly 2, a plurality of first fluid guide assemblies 3 and a plurality of second fluid guide assemblies 4.

The platform 1 has a retaining post 11 anchored to an underwater ground. As shown in FIGS. 1 and 5, the retaining post 11 is extended from a bottom of the platform 1 downwardly and anchored to the underwater ground. In a preferred embodiment of the present invention, the retaining post 11 is inserted into a seabed and secured so as to prevent the platform 1 from being flushed by sea waves.

Figure 3:
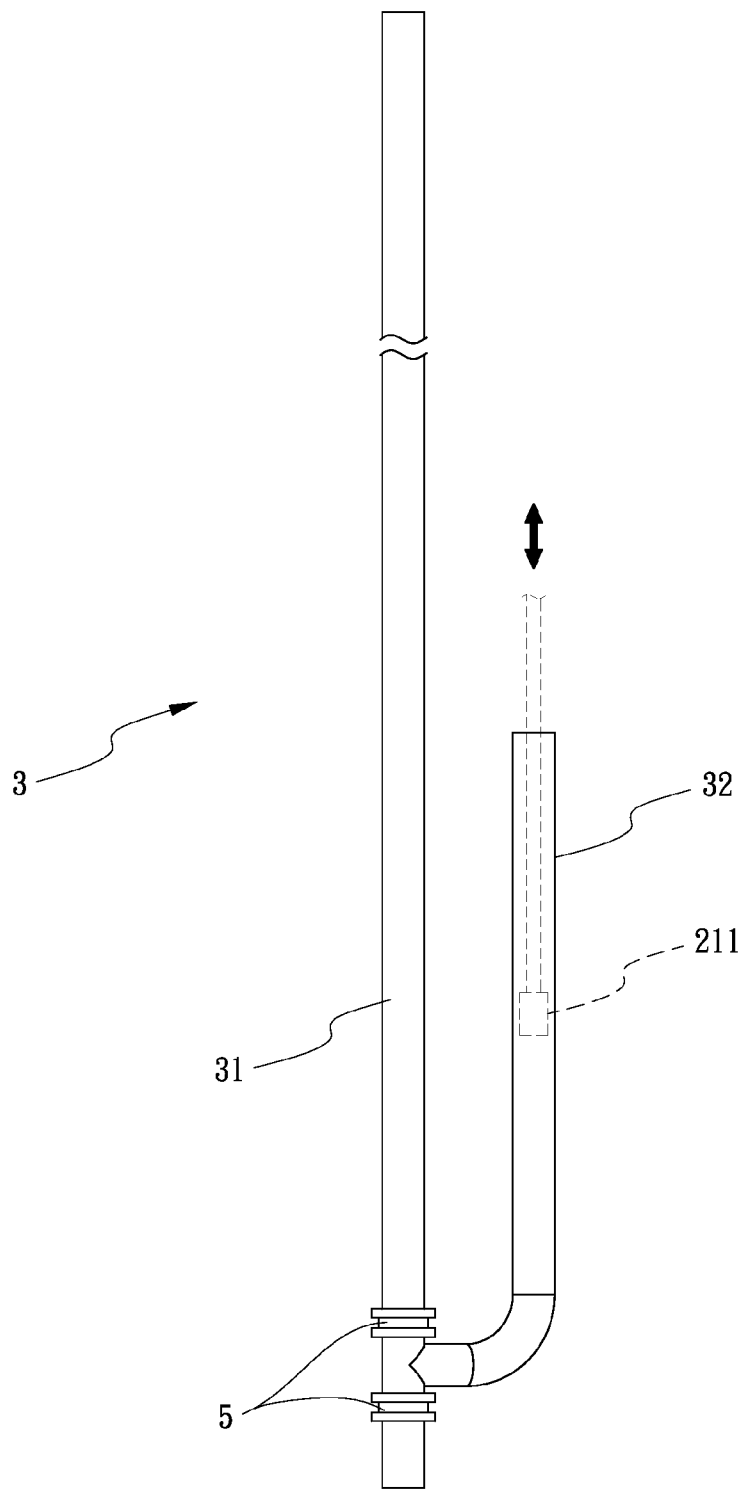
FIG. 3 illustrates a first fluid guide assembly of the wave power converting device, wherein a first piston is inserted into a first side tube.
Figure 4:
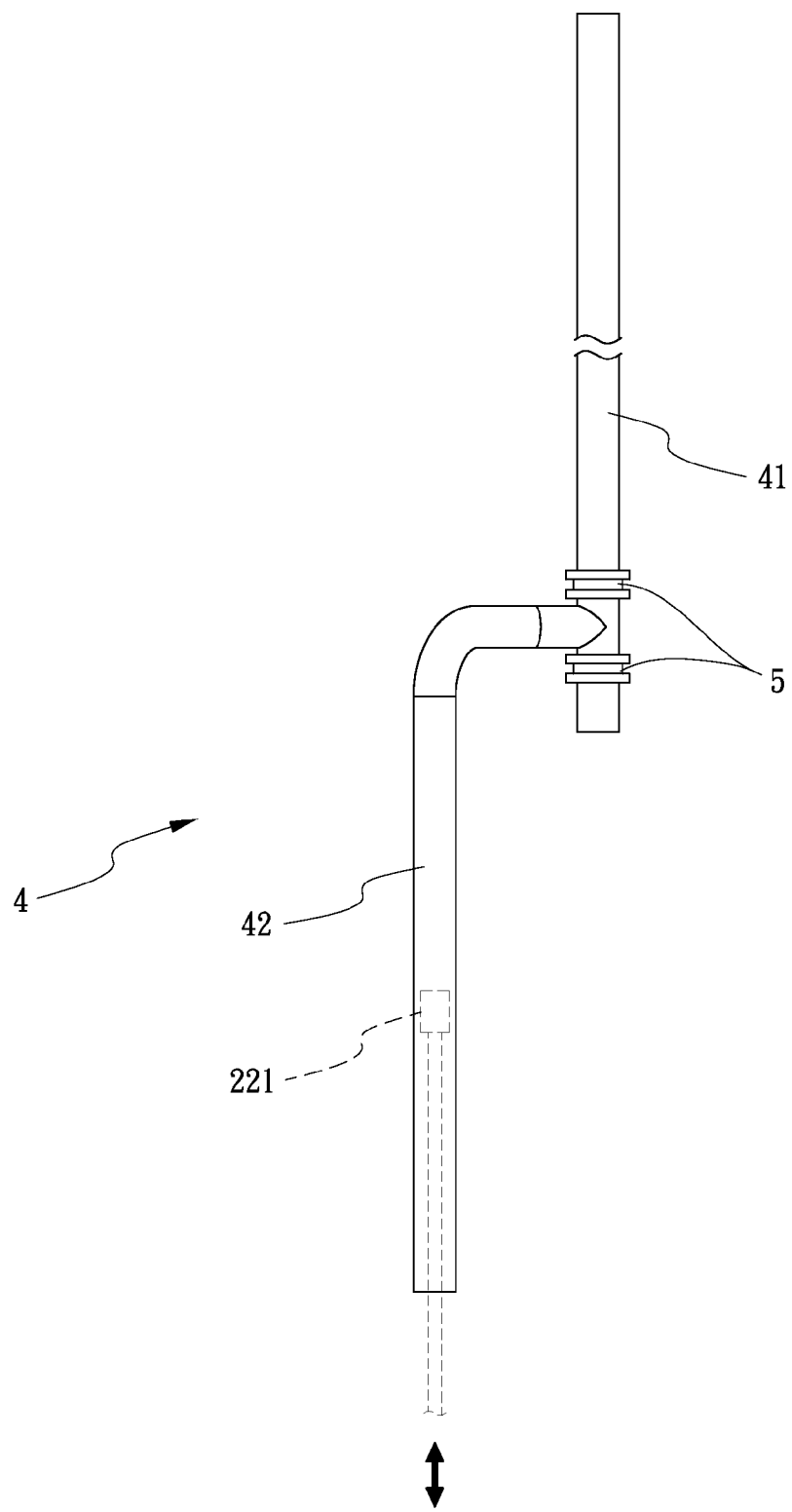
FIG. 4 illustrates a second fluid guide assembly of the wave power converting device, wherein a second piston is inserted into a second side tube.

Referring to FIGS. 3-4, the first fluid guide assemblies 3 are assembled to the platform 1. Each of the first fluid guide assemblies 3 has a first guide tube 31 and a first side tube 32. The first guide tube 31 is disposed underwater with one end. The first side tube 32 is extended upwardly from one lateral side of the first guide tube 31. The first side tube 32 communicates with the first guide tube 31. The second fluid guide assemblies 4 are assembled to the platform 1. Each of the second fluid guide assemblies 4 has a second guide tube 41 and a second side tube 42. The second guide tube 41 is disposed underwater with one end. The second side tube 42 is extended downwardly from one lateral side of the second guide tube 41. The second side tube 42 communicates with the second guide tube 41. The first fluid guide assemblies 3 and the second fluid guide assemblies 4 are disposed around the platform 1. The first guide tube 31 and the second guide tube 41 are disposed underwater with one ends. The first guide tube 31 and the second guide tube 41 both have two check valves 5 disposed therein. The first side tube 32 is connected to the first guide tube 31 between the two check valves 5 of the first guide tube 31. The second side tube 42 is connected to the second guide tube 41 between the two check valves 5 of the second guide tube 41. Therefore, when water flows into the first guide tube 31 and the second guide tube 41 from one ends thereof, the respective check valves 5 are provided to prevent a reverse flow of water.

Referring to FIGS. 1, 2 and 5, the floating assembly 2 has a top plate 21, a bottom plate 22 and a connecting rod 23. The connecting rod 23 connects the top plate 21 and the bottom plate 22. A buoy body 24 is mounted around the top plate 21. The floating assembly 2 is assembled to the platform 1 and the floating assembly 2 is movable up and down relative to the platform 1. The top plate 21 has a plurality of first pistons 211 extended downwardly therefrom. Each of the first pistons 211 is inserted into the respective first side tube 32. The bottom plate 22 has a plurality of second pistons 221 extended upwardly therefrom. Each of the second pistons 221 is inserted into the respective second side tube 42. The connecting rod 23 is movably mounted around the retaining post 11 of the platform 1 so that the floating assembly 2 could be moved relative to the retaining post 11. Therefore, when the buoy body 24 is driven by waves, the top plate 21, the bottom plate 22 and the connecting rod 23 are moved simultaneously so as to drive the first pistons 211 and the second pistons 221 reciprocated vertically. Wherein, each first piston 211 is inserted into the respective first side tube 32 so as to press the water into the first guide tube 31, and each second piston 221 is inserted into the respective second side tube 42 so as to press the water into the second guide tube 41.

Referring to FIG. 2, the top plate 21 has a plurality of positioning grooves 212 defined around an outer periphery thereof. The adjacent positioning grooves 212 are separated by a distance. The first fluid guide assemblies 3 and the second fluid guide assemblies 4 are located in the corresponding positioning grooves 212 so as to maintain the stability of the top plate 21.

Furthermore, a plurality of support rails 25 is disposed on outer peripheries of the respective first guide tube 31 and the respective second guide tube 41. The support rails 25 are mounted on the corresponding first guide tube 31 and the second guide tube 41. As shown in FIGS. 1 and 5, in a preferring embodiment, the first guide tube 31 and the second guide tube 41 are cylindrical-shaped. The buoy body 24 has a plurality of slide portions 241 mounted on one side thereof. The adjacent slide portions 241 are separated by a distance. The slide portions 241 correspond to the support rails 25 so that the buoy body 24 could be slid relative to the support rails 25 via the slide portions 241. In addition, each slide portion 241 has a sliding wheel 2411 assembled therein and contacted to the corresponding support rail 25, so that each slide portion 241 could be slid on the respective support rail 25 smoothly via the sliding wheel 2411.

Figures 6, 7:
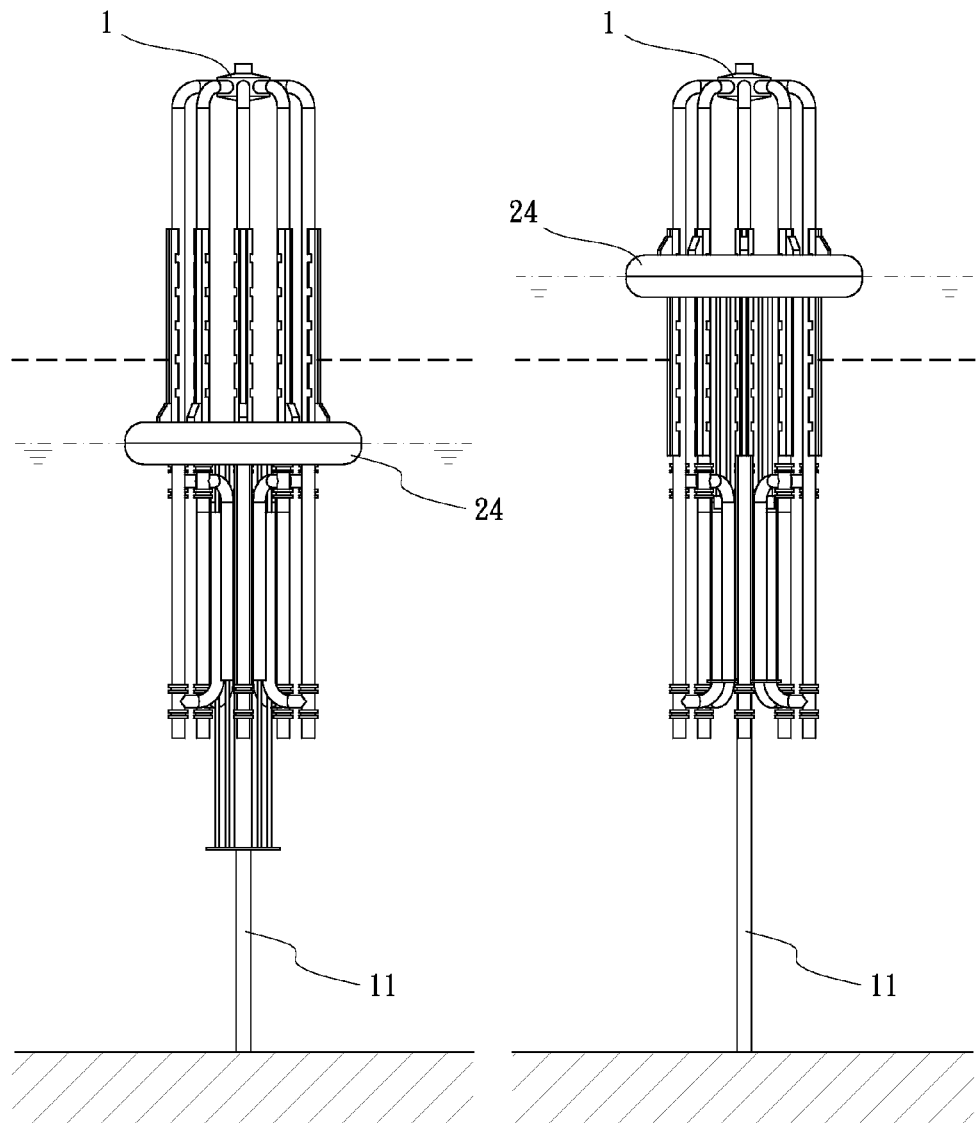

Referring to FIGS. 1, 5, 6, 7, when the buoy body 24 is moved by the waves so as to drive the floating assembly 2 moved up and down, the water flows into the first guide tube 31 and the second guide tube 41 and the water in the first guide tube 31 and the second guide tube 41 is pressed upwardly via the reciprocation of the first piston 211 and the second piston 221. Therefore, the water flows upwardly to a reservoir (not shown) above the platform 1. The potential energy of the water in the reservoir can be converted into electrical energy or other applications. The mechanism of the present invention is described above, wherein the water flows upwardly through the first fluid guide assemblies 3 and the second fluid guide assemblies 4 by the motion of the floating assembly. FIG. 6 shows the wave power converting device under a low water level condition and FIG. 7 shows the wave power converting device under a high water level condition. Therefore, the water lever difference provides a potential energy which can be converted into electrical energy.

What is claimed is:

1. A wave power converting device, comprising:
   a platform, the platform having a retaining post anchored to an underwater ground;
   a plurality of first fluid guide assemblies assembled to the platform, each of the first fluid guide assemblies having a first guide tube and a first side tube, the first guide tube disposed underwater with one end, the first side tube extended upwardly from one lateral side of the first guide tube;
   a plurality of second fluid guide assemblies assembled to the platform, each of the second fluid guide assemblies having a second guide tube and a second side tube, the second guide tube disposed underwater with one end, the second side tube extended downwardly from one lateral side of the second guide tube; and
   a floating assembly, the floating assembly having a top plate, a bottom plate and a connecting rod, the floating assembly assembled to the platform and the floating assembly being movable up and down relative to the platform, the top plate having a plurality of first pistons extended downwardly therefrom, each of the first pistons inserted into the respective first side tube, the bottom plate having a plurality of second pistons extended upwardly therefrom, each of the second pistons inserted into the respective second side tube, the top plate having a plurality of positioning grooves defined around an outer periphery thereof, the adjacent positioning grooves being separated by a distance, the first fluid guide assemblies and the second fluid guide assemblies being located in the corresponding positioning grooves;
   wherein, when the buoy body is moved by the waves so as to drive the floating assembly moved up and down, the water flows into the first guide tube and the second guide tube and the water in the first guide tube and the second guide tube is pressed upwardly via the reciprocation of the first piston and the second piston, so that the water flows upwardly to a reservoir above the platform.

2. The wave power converting device as claimed in claim 1, wherein the connecting rod is movably mounted around the retaining post of the platform.

3. The wave power converting device as claimed in claim 1, wherein the first guide tube and the second guide tube both have two check valves disposed therein; the first side tube is connected to the first guide tube between the two check valves of the first guide tube; the second side tube is connected to the second guide tube between the two check valves of the second guide tube.

4. The wave power converting device as claimed in claim 1, further comprises a plurality of support rails disposed on outer peripheries of the respective first guide tube and the respective second guide tube; the support rails are mounted on the corresponding first guide tube and the second guide tube; the buoy body has a plurality of slide portions mounted on one side thereof; the adjacent slide portions are separated by a distance; the slide portions correspond to the support rails so that the buoy body could be slid relative to the support rails via the slide portions.

5. The wave power converting device as claimed in claim 4, wherein each slide portion has a sliding wheel assembled therein and contacted to the corresponding support rail.

\* \* \* \* \*